United States Patent
Taguchi et al.

(10) Patent No.: US 7,784,579 B2
(45) Date of Patent: Aug. 31, 2010

(54) MEMBER DISENGAGEMENT APPARATUS

(75) Inventors: Katsuaki Taguchi, Wako (JP); Tadashi Naito, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 776 days.

(21) Appl. No.: 11/508,928

(22) Filed: Aug. 24, 2006

(65) Prior Publication Data

US 2007/0057563 A1   Mar. 15, 2007

(30) Foreign Application Priority Data

Aug. 25, 2005   (JP)   ............... 2005-244902

(51) Int. Cl.
*B60R 21/00* (2006.01)
(52) U.S. Cl. ............... 180/271; 297/216.16
(58) Field of Classification Search ............ 137/67–77; 180/279, 271; 206/335; 296/37.8, 37.12; 297/216.16
See application file for complete search history.

(56) References Cited

U.S. PATENT DOCUMENTS

| | | | | |
|---|---|---|---|---|
| 2,714,521 A | * | 8/1955 | Graham | ............ 180/281 |
| 5,006,829 A | * | 4/1991 | Miyamoto et al. | ............ 340/459 |
| 5,522,638 A | * | 6/1996 | Falcoff et al. | ............ 296/37.8 |
| 6,157,090 A | * | 12/2000 | Vogel et al. | ............ 307/10.1 |

FOREIGN PATENT DOCUMENTS

| | | |
|---|---|---|
| JP | 02-034452 A | 2/1990 |
| JP | 7-27119 A | 1/1995 |
| JP | 2000-233711 A | 8/2000 |

* cited by examiner

*Primary Examiner*—Paul N. Dickson
*Assistant Examiner*—Timothy D Wilhelm
(74) *Attorney, Agent, or Firm*—Arent Fox LLP

(57) ABSTRACT

A member disengagement apparatus comprises fastening release parts for disengaging fastened members fastened by fastening parts, a release operation unit for releasing the fastening release parts, an operation-inhibiting unit for inhibiting a release operation of the release operation unit, and a control unit for controlling the operation-inhibiting unit. The control unit controls the operation-inhibiting unit so that the release operation is no longer inhibited when specific emergency signals are received.

6 Claims, 12 Drawing Sheets

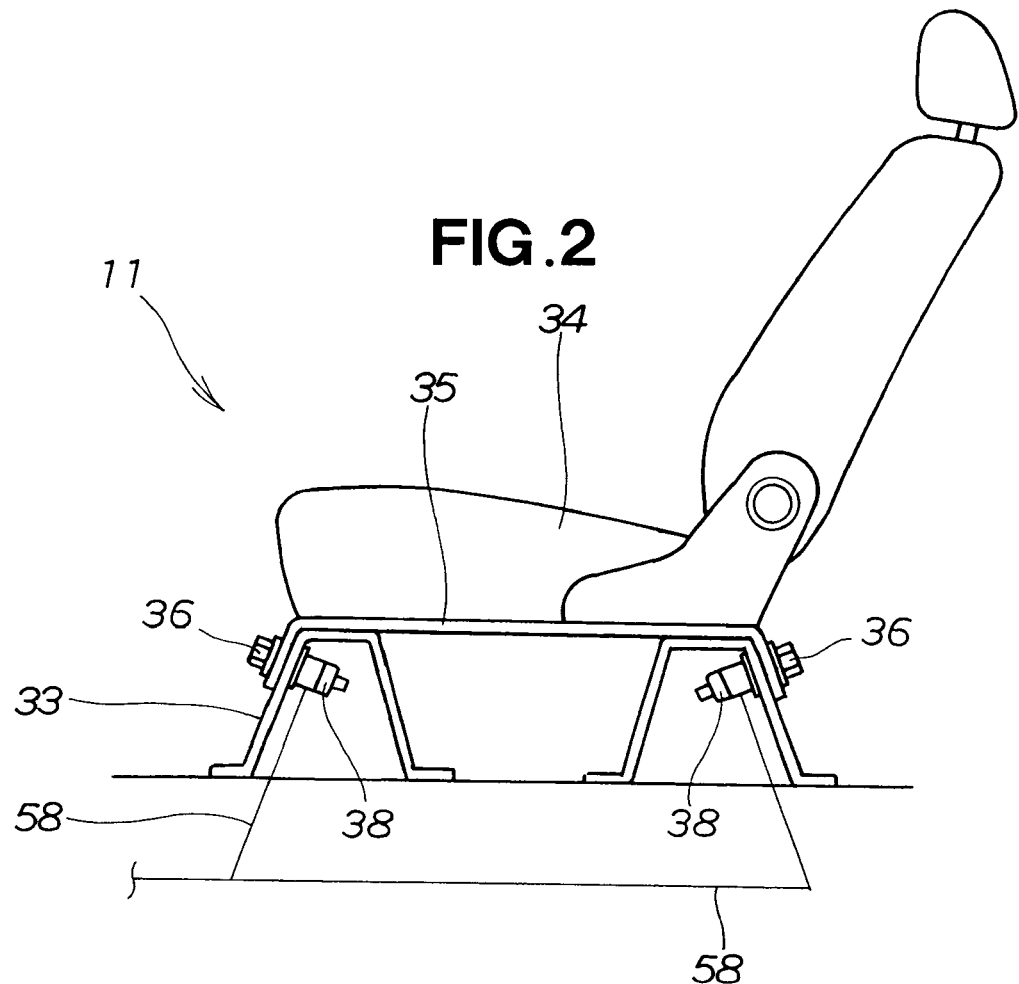
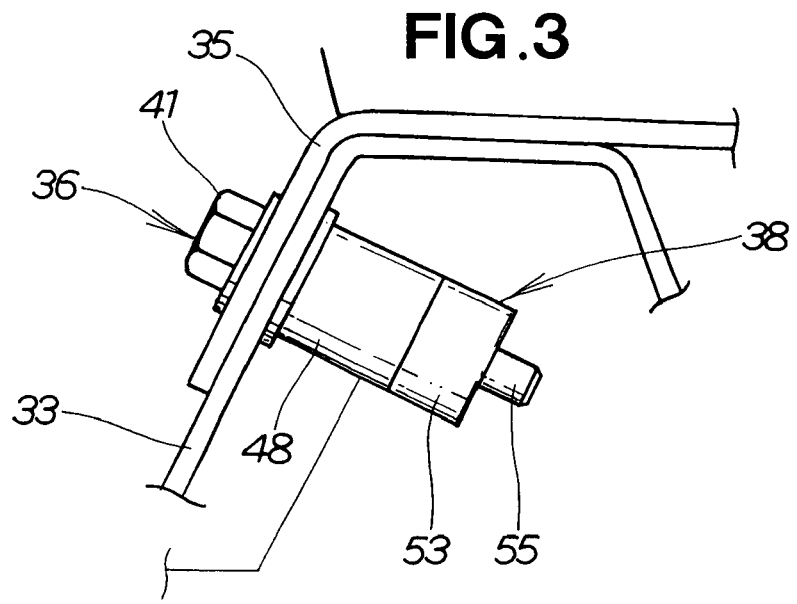

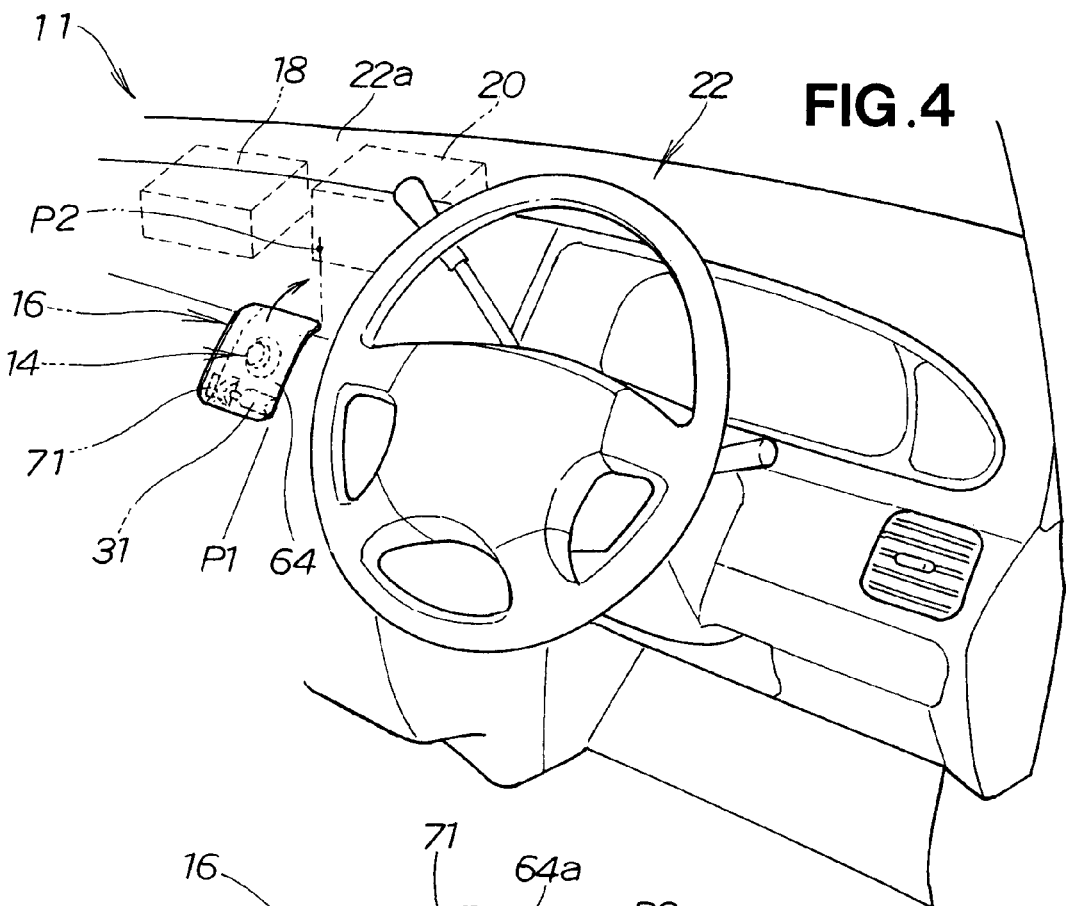
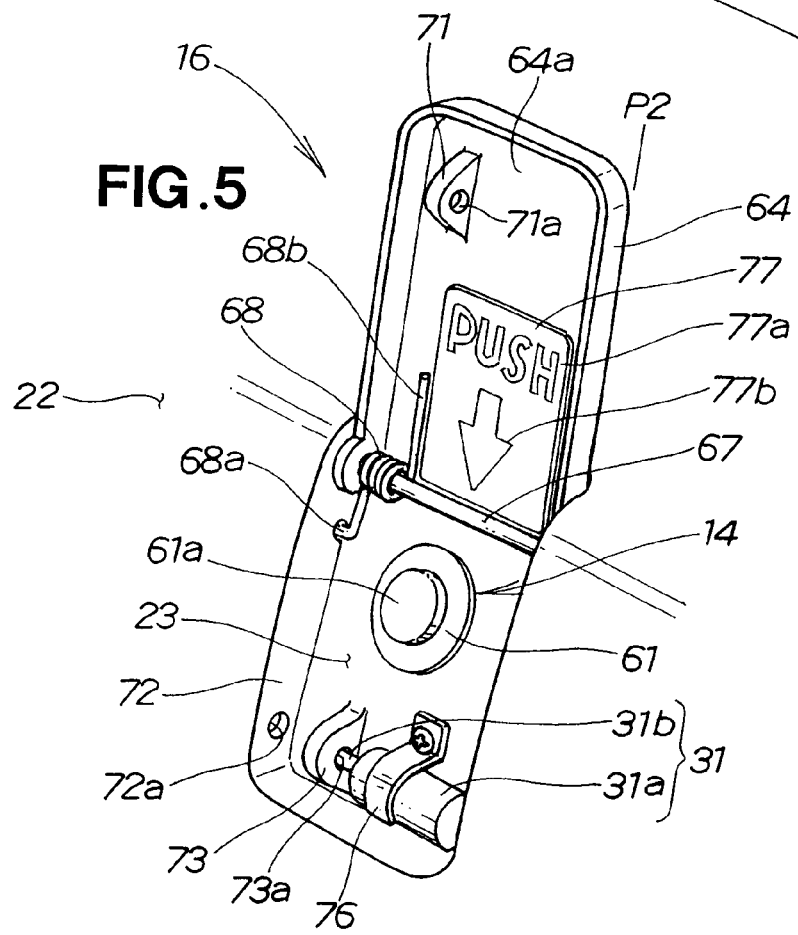

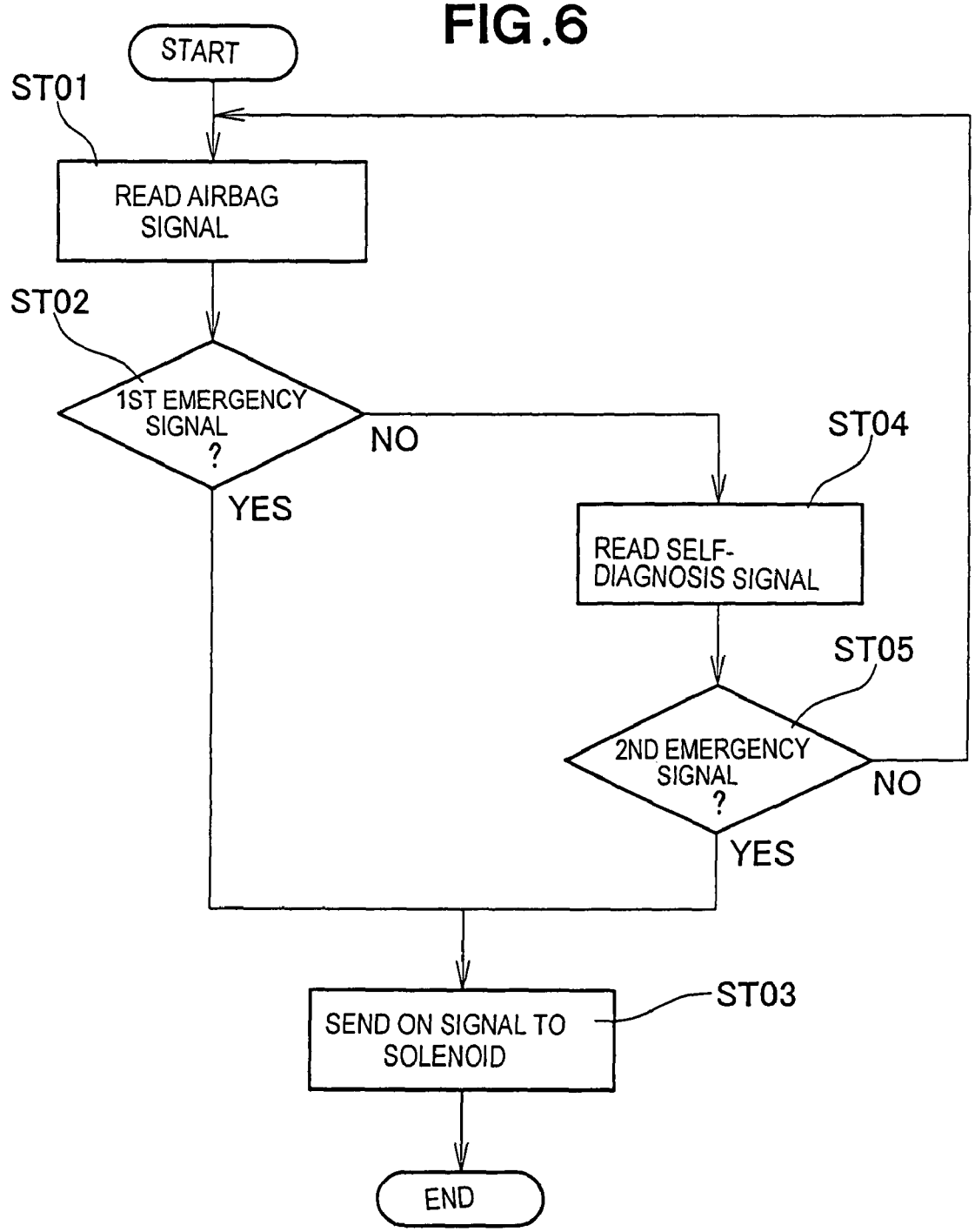

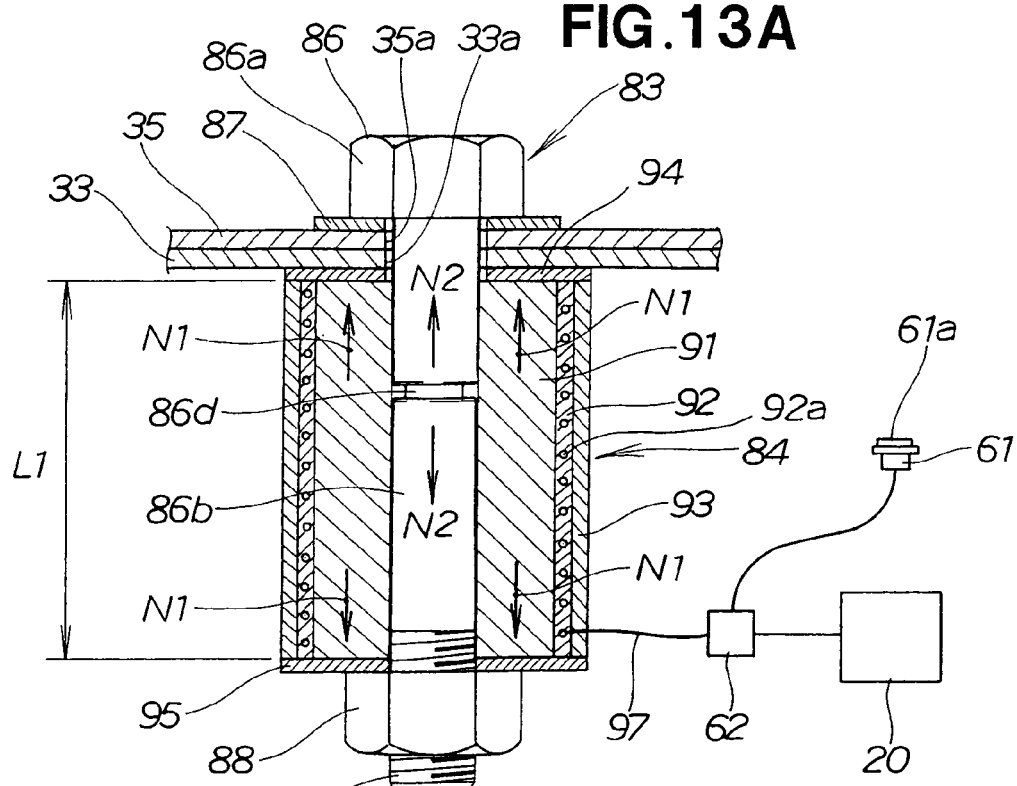
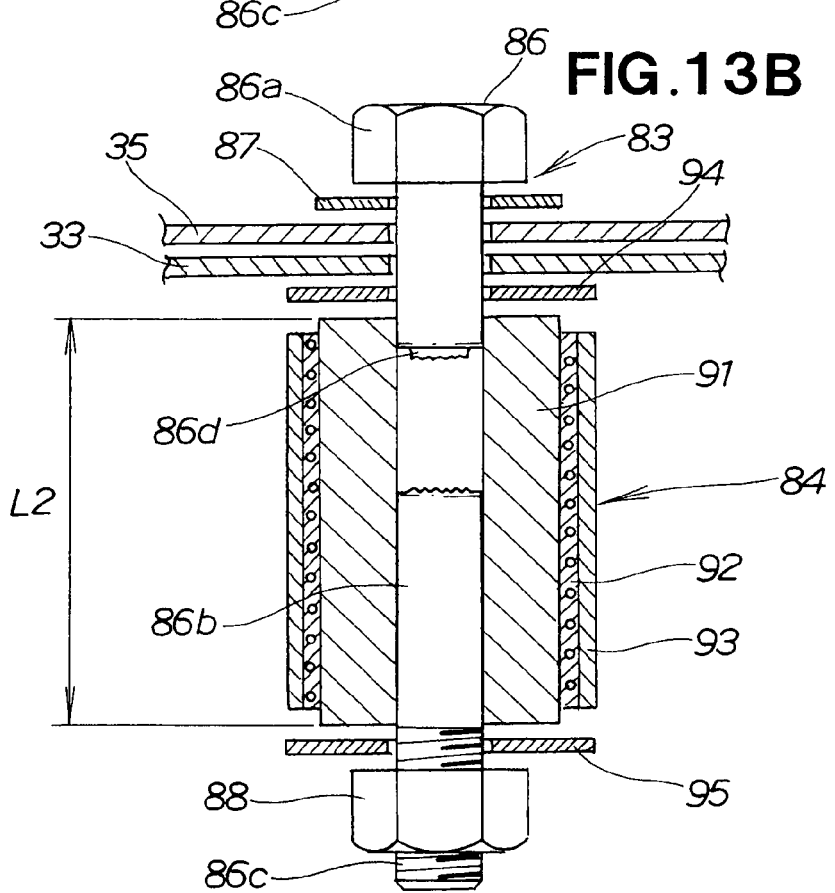

MEMBER DISENGAGEMENT APPARATUS

FIELD OF THE INVENTION

The present invention relates to a member disengagement apparatus for disengaging a plurality of fastened members fastened by fastening parts.

BACKGROUND OF THE INVENTION

Various assemblies, including vehicles and industrial machinery, have members (fastened members) fastened together by bolts, rivets, and other fastening parts. In automobiles, for example, the seats, seat belts, doors, and other members are fastened to the vehicle body by bolts.

These various assemblies are subject to the effects of all kinds of accidents. During an emergency in which an airbag expands, for example, in cases in which an automobile is subjected to the effects of a collision or any other accident, it is preferable that the passengers rapidly exit the vehicle of their own volition. It is therefore even more preferable that members hindering the passengers from exiting the vehicle be rapidly removed from the vehicle body. Moreover, these members should not be removed from the vehicle body under normal circumstances.

There is a member disengagement apparatus for immediately disengaging fastened members fastened by fastening parts. This member disengagement apparatus is disclosed in Japanese Patent Laid-Open Publication No. 7-27119 (JP-A-7-27119).

The member disengagement apparatus disclosed in the 7-27119 publication has fastening parts that are configured from bolts and nuts, wherein the nuts are secured to one of fastened members with the aid a low-melting material. When the fastened state is released by this member disengagement apparatus, the low-melting material is heated and melted with a heater to rapidly separate the nuts from one of the fastened members. As a result, the fastened members are rapidly disengaged.

It has therefore been suggested that fastening parts that need to be rapidly separated from the vehicle body of such an automobile during emergencies can be provided with the member disengagement apparatus disclosed in the 7-27119 publication. In this case, members that hinder the passenger from exiting the vehicle can be rapidly removed from the vehicle body during emergencies. However, it is preferable that it not be possible for the passenger to accidentally operate the member disengagement apparatus under normal circumstances.

An apparatus designed so that the passenger cannot accidentally disengage fastened members is used to prevent such accidental release. This apparatus is disclosed in Japanese Patent Laid-Open Publication No. 2000-233711 (JP-A-2000-233711) as a passenger protection apparatus included in ride cars in amusement parks.

The passenger protection apparatus disclosed in the 2000-233711 publication comprises a seat belt for restraining the passenger in the car seat, wherein the seat belt buckle is covered by a protective cover that can be locked. A lock releasing switch for releasing the locked state of the protective cover is placed in an operating room positioned at a distance from the ride cars. The passenger cannot release the locked state of the buckle covered by the protective cover. When the locked state of the protective cover needs to be released, the operator operates the lock releasing switch in the operating room.

In view of this, one possibility is to combine the passenger protection apparatus disclosed in the 2000-233711 publication with the member disengagement apparatus disclosed in the 7-27119 publication, and to use this combination in an automobile. In this case, covering the release operation unit of the member disengagement apparatus by a protective cover makes it possible to prevent the passengers in the vehicle from accidentally operating the release operation unit.

However, since the release operation unit is covered by a protective cover, members that hinder the passenger from exiting the vehicle during emergencies cannot, as they are, be removed from the vehicle frame by the passenger's own volition. In addition to automobiles and other vehicles, this is also true for various other assemblies including industrial machinery.

In view of this, there is a need for a technique whereby a person directly involved with an assembly can rapidly disengage the fastening parts only during emergencies in a direct manner.

SUMMARY OF THE INVENTION

According to the present invention, there is provided a member disengagement apparatus for disengaging a plurality of fastened members fastened by fastening parts, the apparatus comprising fastening release parts for disengaging the fastened members, a release operation unit for releasing the fastening release parts, an operation-inhibiting unit for inhibiting a release operation of the release operation unit, and a control unit for controlling the operation-inhibiting unit so that the release operation is no longer inhibited when specific emergency signals are received.

Thus, the member disengagement apparatus comprises an operation-inhibiting unit for inhibiting the release operation, making it possible for the operation of the release operation unit under normal circumstances to be securely inhibited by the operation-inhibiting unit. Therefore, during normal situations, persons directly involved with the assembly can be securely prevented from accidentally operating the release operation unit. Fastening by the fastening parts can be securely maintained, and the reliability of the fastened state can therefore be sufficiently ensured.

In cases in which the control unit receives a specific emergency signal, the operation-inhibiting unit can be controlled by the control unit so as to stop inhibiting the release operation. As a result, the release operation of the release operation unit is enabled. Persons directly involved with the assembly can rapidly release fastened state maintained by the fastening parts by operating the release operation unit and actuating the fastening release parts. Thus persons directly involved with the assembly can directly perform the operation of rapidly and securely releasing the fastening parts during emergencies.

It is preferable that the emergency signals include a signal that causes a vehicle airbag to expand and deploy, and that the fastened members be members of a vehicle that are disengaged during specific emergencies.

It is preferable that the release operation unit and the operation-inhibiting unit be disposed in a widthwise middle of an instrument panel of the vehicle.

It is preferable that the operation-inhibiting unit comprise an holding concavity that holds the release operation unit and that is formed in the instrument panel, a lid for opening and closing the holding concavity, a supporting pin for openably and closeably supporting one end of the lid, an urging member for urging the lid in an opening direction, and a lid opening part for opening the lid according to a determent release signal from the control unit.

It is preferable that the apparatus comprise a dedicated power source for supplying electricity to the control unit; and that the dedicated power source and the control unit be configured as one unit.

It is preferable that the release operation unit comprise a press-button switch for activating the release operation.

It is preferable that each of the fastening release parts comprise a heating part for generating heat according to a release operation of the release operation unit, and a joining member composed of a low-melting material that melts when heated by the heating part; and that the fastening parts be disengaged by melting of the joining member.

It is preferable that each of the fastening release parts comprise a heating part for generating heat according to a release operation of the release operation unit, and an actuator composed of a shape-memory material that returns to an original length when heated to a specific temperature by the heating part; and that the fastening parts be disengaged as a result of the actuators returning to the original length.

BRIEF DESCRIPTION OF THE DRAWINGS

A preferred embodiment of the present invention is described in detail below, by way of example only, with reference to the accompanying drawings, in which:

FIG. 2 is an enlarged side view of the fastening parts and the fastened members shown in FIG. 1;

FIG. 3 is a side view showing a further enlarged view of a fastening part shown in FIG. 2;

FIG. 4 is a perspective view of a possible layout of the release operation unit and the operation-inhibiting unit shown in FIG. 1;

FIG. 5 is a perspective view of the release operation switch and the operation-inhibiting unit shown in FIG. 4;

FIG. 6 is a control flow chart of the control unit shown in FIG. 1;

FIGS. 13A and 13B are diagrams describing the operation of the joined part and the fastening release part shown in FIG. 12.

DETAILED DESCRIPTION OF THE PREFERRED EMBODIMENT

Figure 1:
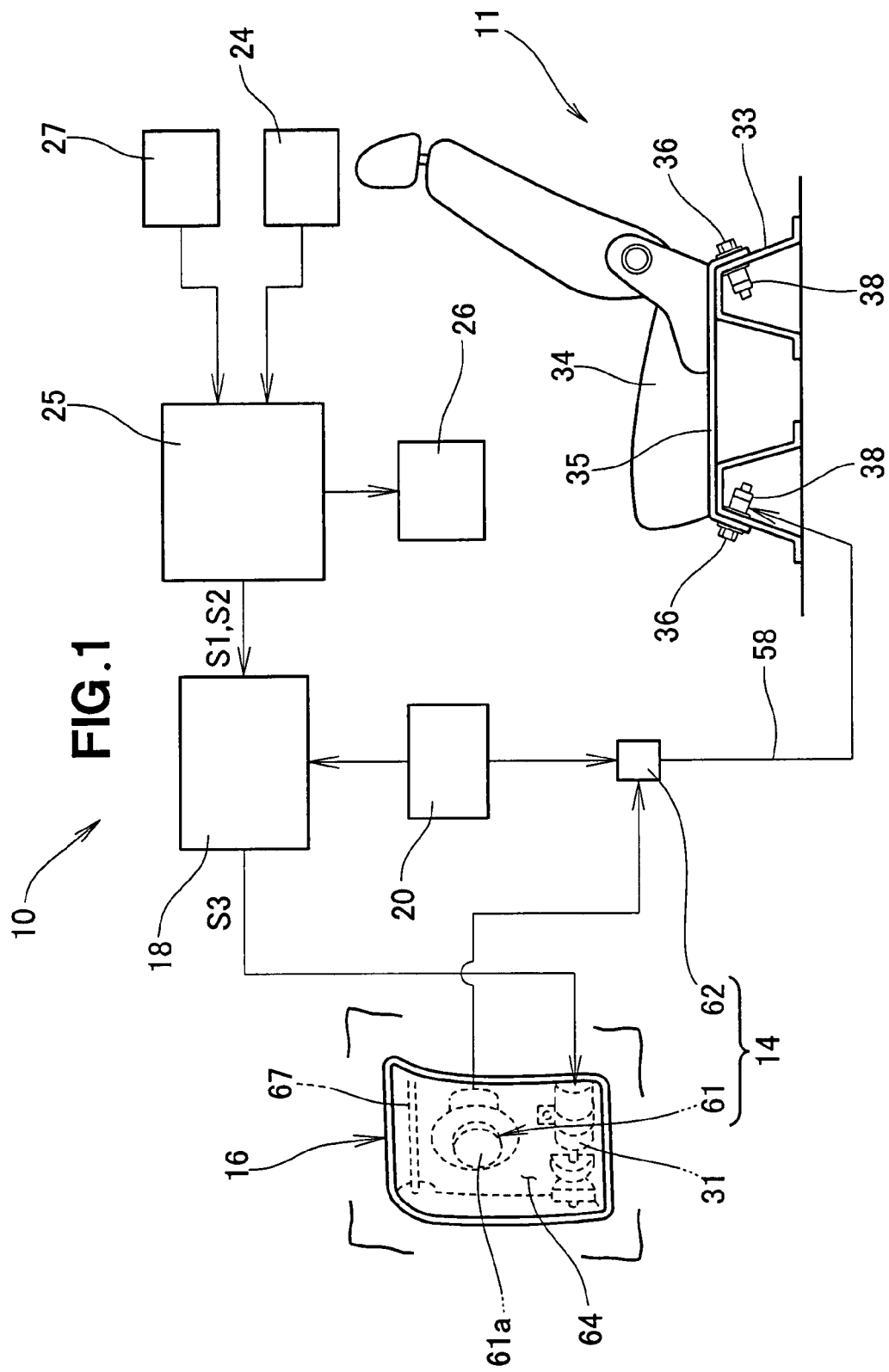
FIG. 1 is a block diagram depicting the member disengagement apparatus according to a first embodiment of the present invention.

Fastening parts 36 are used in various assemblies (automobiles and other vehicles, industrial machinery, and buildings, for example) to fasten certain members together, as shown in FIGS. 1 through 3.

For example, in an automobile or another vehicle 11, various accessories can be fastened onto a vehicle body 33 with fastening parts 36. One example of such a joint in the automobile 11 is that the fastening parts 36 attach the base 35 of a seat 34 to the vehicle body 33. In this case, the vehicle body 33 is one fastened member, and the base 35 is the other fastened member.

The fastening parts 36 are released by means of a member disengagement apparatus 10, as shown in FIG. 1. An example in which the member disengagement apparatus 10 is applied in an automobile is described hereinbelow.

The member disengagement apparatus 10 is used to disengage (disconnect) fastened members 33, 35 fastened together by the fastening parts 36, as shown in FIG. 1. The member disengagement apparatus 10 is composed of fastening release parts 38 for releasing the fastened state maintained by the fastening parts 36, a release operation unit 14 for releasing the fastening release parts 38, an operation-inhibiting unit 16 for inhibiting the release operation of the release operation unit 14, a control unit 18 for controlling the operation-inhibiting unit 16, and a power source 20.

The release operation unit 14 is composed of a release operation switch 61, and a relay 62 that is operated by the release operation switch 61.

The release operation switch 61 is composed of a press-button switch (push-button switch), for example. The release operation switch 61 is hereinbelow referred to as a "press-button switch 61" as appropriate. This press-button switch 61 is a contact self-resetting manual switch that is on when a press-button 61a is being pressed. When the press-button 61a is released, the press-button switch 61 is returned to the initial un-pressed state by the force of a return spring, and is turned off. The press-button switch 61 can be easily operated during emergencies by passengers.

The relay 62 is composed of an electromagnetic relay, for example. The electromagnetic relay is composed of a coil and a normally open contact that turns on when the coil is magnetized. The power source 20 supplies electricity to the coil of the relay 62 when the press-button switch 61 is on. As a result, the normally open contact is turned on by magnetizing the coil.

The power source 20 is electrically connected to the fastening release parts 38 by a wire harness 58 via the normally open contact of the relay 62. The power source 20 is used to supply electricity to the release operation unit 14, the operation-inhibiting unit 16, and the control unit 18. The power source 20 is referred to as the "dedicated power source 20" hereinbelow as appropriate. The dedicated power source 20 is composed of a capacitor, for example. The reliability of the member disengagement apparatus 10 can be improved by using a long-life capacitor for the dedicated power source 20. The method for charging the dedicated power source 20 is the same as the method for conventional automobile batteries.

As is clear from the above description, the relay 62 turns on when the press-button switch 61 is on. Therefore, electricity can be supplied from the power source 20 to the fastening release parts 38 when the press-button switch 61 is on.

The control unit 18 controls the operation-inhibiting unit 16 according to specific emergency signals S1, S2 sent from a primary control unit 25. Specifically, the control unit 18 determines that an emergency situation has arisen upon receiving first and second emergency signals S1, S2, and sends an unlock signal S3 (operation-enabling signal S3) to a lid opening part 31 of the operation-inhibiting unit 16.

The primary control unit 25 unifies the control of the entire automobile system, determines various emergency states, and sends specific emergency signals S1, S2 to the control unit 18. The various emergency states include, for example, a first emergency state that accompanies an automobile collision, and a second emergency state based on the results of the automobile's self-diagnosis.

Specifically, when a collision detection unit 24 detects a collision at a specific threshold level or greater, the primary control unit 25 determines that the first emergency state is in effect according to a detection signal from the collision detection unit 24. At this time, the primary control unit 25 sends a first emergency signal S1 to both the control unit 18 and an airbag 26. The airbag 26 expands within the vehicle according to the first emergency signal S1 (expansion signal S1), and deploys around the passenger.

Furthermore, the primary control unit 25 sends a second emergency signal S2 to the control unit 18 when the detection signal sent from a self-diagnosis detection unit 27 is equal to or greater than a specific threshold value; i.e., when it has been determined that the second emergency state is in effect.

As described above, the first emergency signal S1 uses an expansion signal (airbag signal) to deploy the airbag 26. Also, the second emergency signal is sent from the primary control unit 25 to the control unit 18 when the self-diagnosis detection unit 27 (an acceleration sensor and a displacement sensor, for example) has detected that a non-collision accident has occurred. In other words, the second emergency signal S2 uses a self-diagnosis signal. Thus, there is no need to provide new equipment for sending the first and second emergency signals S1, S2, because the existing equipment of the primary control unit 25 is used to send the first and second emergency signals S1, S2 to the control unit 18.

In the self-diagnosis detection unit 27, an acceleration sensor detects the extent and direction of a collision acting on the vehicle body, for example. A displacement sensor detects the extent and direction of deformation in the vehicle body, for example.

As is clear from the above description, the control unit 18 is used exclusively for the member disengagement apparatus 10, and is independent of the existing primary control unit 25. The control unit 18 is referred to as a "dedicated control unit 18" hereinbelow as appropriate. The dedicated power source 20 is also used exclusively for the member disengagement apparatus 10, and is independent of the existing primary control unit 25 and the existing power source. Thus, the control unit 18 and the dedicated power source 20 are combined into one unit. Therefore, only the member disengagement apparatus 10 can be unitized. The reliability of the member disengagement apparatus 10 can be further improved.

Next, the release operation unit 14 and the operation-inhibiting unit 16 will be described.

The release operation unit 14 and the operation-inhibiting unit 16 are disposed in the widthwise center 22a of the vehicle in an instrument panel 22 in an automobile 11, as shown in FIG. 4. The control unit 18 of the power source 20 are also provided in the center 22a of the instrument panel 22 in this example. The control unit 18 and the power source 20 are adjacent to each other. Therefore, the reliability of the member disengagement apparatus 10 during emergencies in the automobile 11 can be further improved. Moreover, the release operation unit 14 is easily reached by a passenger during emergencies.

The instrument panel 22 has a shallow holding concavity 23 in the surface in the widthwise center 22a of the vehicle, as shown in FIGS. 4 and 5. The holding concavity 23 holds the release operation unit 14. In FIGS. 4 and 5, the relay 62 (see FIG. 1) is omitted.

The operation-inhibiting unit 16 is composed of the holding concavity 23, a lid 64 for opening and closing the holding concavity 23, a supporting pin 67 for openably and closeably supporting one end of the lid 64, a "torsion coil spring 68" for urging the lid 64 towards its open position, and a lid opening part 31 for opening the lid 64, as shown in FIGS. 4 and 5. Therefore, the operation-inhibiting unit 16 has a relatively simple configuration.

More specifically, one end of the lid 64 is provided at the top of the holding concavity 23, and is capable of swinging on to the supporting pin 67. Therefore, the lid 64 can be opened and closed between a closed position P1 of being completely closed, and an open position P2 of being completely open. The other end of the lid 64 comprises a protruding piece 71 that protrudes from the back surface 64a towards the bottom of the holding concavity 23. The protruding piece 71 has a locking hole 71a that runs through the piece and is parallel to the supporting pin 67.

The "torsion coil spring 68" is provided to the supporting pin 67. The spring is an urging member wherein one end 68a is attached in the holding concavity 23, and the other end 68b lies on the back surface 64a of the lid 64. Therefore, the lid 64 is urged by the urging force of the "torsion coil spring 68" towards the open position P2; i.e., in the direction in which the lid 64 is opened.

The lid opening part 31 is composed of a solenoid, for example. The lid opening part 31 will hereinbelow be referred to as the solenoid 31. The solenoid 31 is composed of a solenoid main body 31a that is attached to the holding concavity 23 with a band 76, and a plunger 31b retractable manner in relation to the solenoid main body 31a. The solenoid 31 is disposed so that the plunger 31b can go through the locking hole 71a when the lid 64 is completely closed.

The holding concavity 23 comprises a stationary protruding piece 73 that stands upright from the bottom. This stationary protruding piece 73 is located a fixed interval from the wall 72 of the holding concavity 23. The stationary protruding piece 73 has a first stationary locking hole 73a that runs through the piece and accommodates the plunger 31b. The wall 72 of the holding concavity 23 has a second stationary locking hole 72a that run through the wall and accommodates the plunger 31b. Thus, the plunger 31b, the first stationary locking hole 73a, and the second stationary locking hole 72a are disposed coaxially.

The lid 64 has a display unit 77 provided in the back surface 64a. The display unit 77 is composed of a display sheet affixed on the back surface 64a, for example. The display unit 77 is used to display letters 77a and markings 77b for informing the passenger of the position of the press-button switch 61 or the operation details. The color of the letters 77a and the markings 77b against the background color of the display unit 77 is preferably designed so as to catch the passenger's attention. For example, when the background color of the display unit 77 is red, then the color of the letters 77a and the markings 77b is set to be yellow. The letters 77a preferably read "PUSH" so as to indicate that the press-button 61a is to be pushed. The markings 77b are preferably shaped as an arrow so as to clearly indicate the position of the press-button 61a.

Thus, providing the display unit 77 in the back surface 64a makes it possible to more easily see the position of the press-button switch 61 and the operation details. Appropriately designing the background color of the display unit 77 and the color of the letters 77a and markings 77b also makes it possible to more easily see the position of the press-button switch 61 and the operation details.

Next, the control flow of a case in which the control unit 18 shown in FIG. 1 is a microcomputer will be described based on FIG. 6, with reference to FIG. 1.

Step (hereinafter abbreviated as ST) ST01: A signal sent from the primary control unit 25 is read.

ST02: A determination is made as to whether or not the signal sent from the primary control unit 25 is a first emergency signal S1. When it is a first emergency signal S1, the process advances to ST03, and when it is not a first emergency signal S1, the process advances to ST04.

ST03: An ON signal S3 (operation-enabling signal S3) is sent to the solenoid 31. As a result, the solenoid 31 turns on. The lid 64 opens and the press-button switch 61 is exposed.

ST04: The signal sent from the primary control unit 25 is read.

ST05: A determination is made as to whether or not the signal sent from the primary control unit 25 is a second emergency signal S2. When it is a second emergency signal S2, the process advances to ST03, and when it is not a second emergency signal S2, the process returns to ST01.

Next, the operation of the member disengagement apparatus 10 will be described with reference to FIGS. 6 through 8B.

Figure 7A:
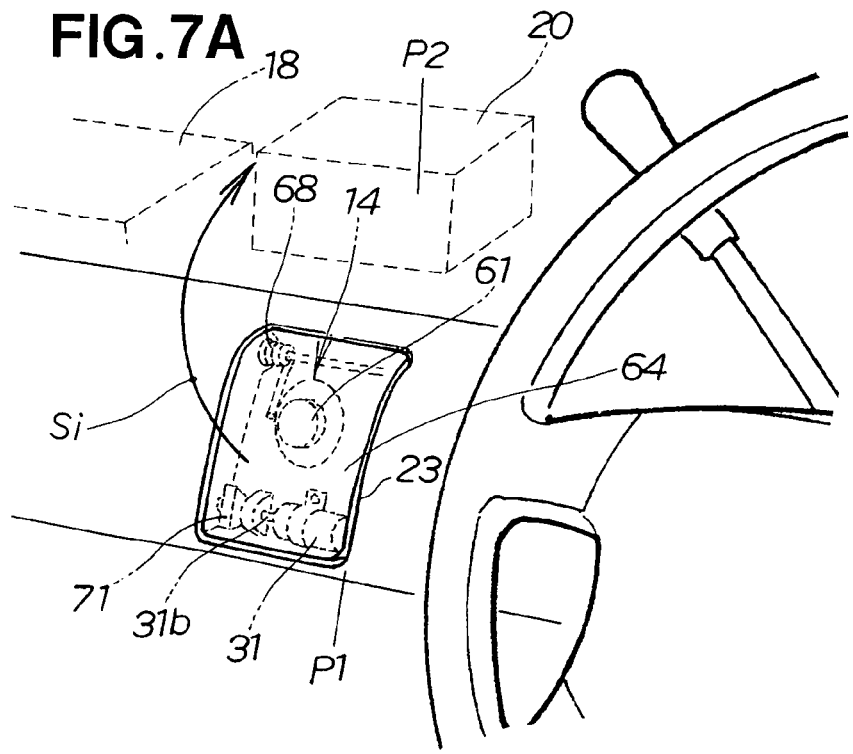
FIGS. 7A and 7B are diagrams describing the operation of the release operation unit and the operation-inhibiting unit shown in FIG. 4.

The control unit 18 shown in FIG. 7A usually does not receive any first emergency signals S1 (ST2 in FIG. 6) or second emergency signals S2 (ST5 in FIG. 6), and therefore keeps the solenoid 31 turned off.

In FIG. 7A, the lid 64 is in the closed position P1 in which the holding concavity 23 is completely closed. The protruding piece 71 of the lid 64 is aligned between the wall 72 and the stationary protruding piece 73 shown in FIG. 7B. Since the solenoid 31 is off, the plunger 31b extends from the solenoid main body 31a and remains inserted through the locking holes 71a, 72a, 73a. As a result, the lid 64 is held by the solenoid 31 in the closed position P1 of covering the holding concavity 23. The lid 64 covers the press-button 61a held in the holding concavity 23, thereby maintaining the state in which the press-button switch 61 is not pressed. Therefore, the press-button 61a cannot be operated.

In a case in which the control unit 18 has subsequently determined that a first emergency signal S1 has been sent (ST2 in FIG. 6) or a second emergency signal S2 has been sent (ST5 in FIG. 6), an operation-enabling signal S3, i.e., an ON signal S3, is sent to the solenoid 31 (ST3 in FIG. 6). The solenoid 31 turns on and the plunger 31b is retracted.

Figure 7B:
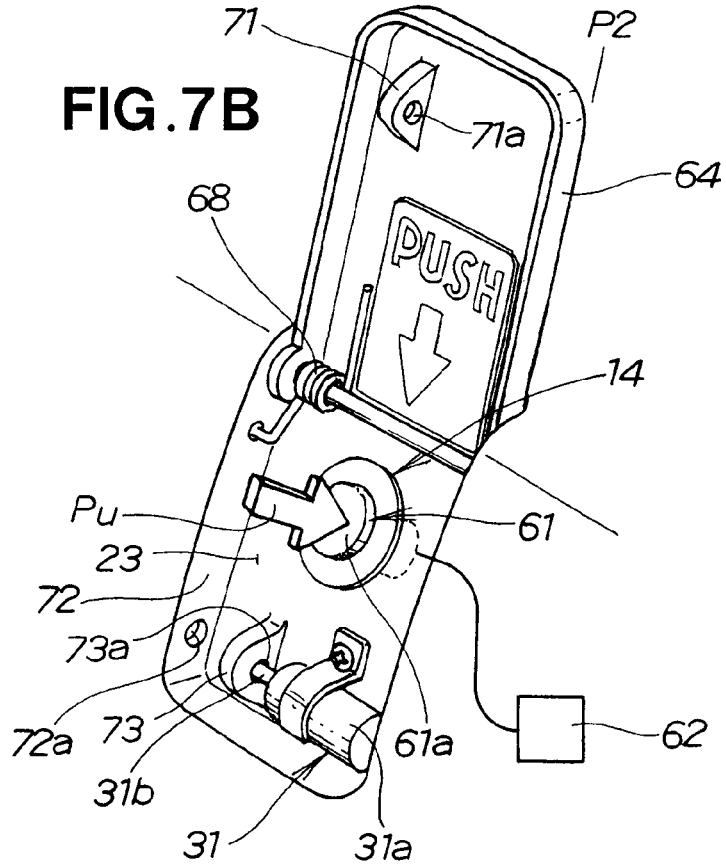

The plunger 31b is retracted towards the solenoid main body 31a and is pulled out from the first stationary locking hole 72a and the locking hole 71a, as shown in FIG. 7B. At this point, the lid 64 is swung to the open position P2, as indicated by the arrow Si, by the urging force of the "torsion coil spring 68." The holding concavity 23 is opened and the press-button 61a is exposed. The passenger can push in the press-button 61a as indicated by the arrow Pu.

Figure 8A:
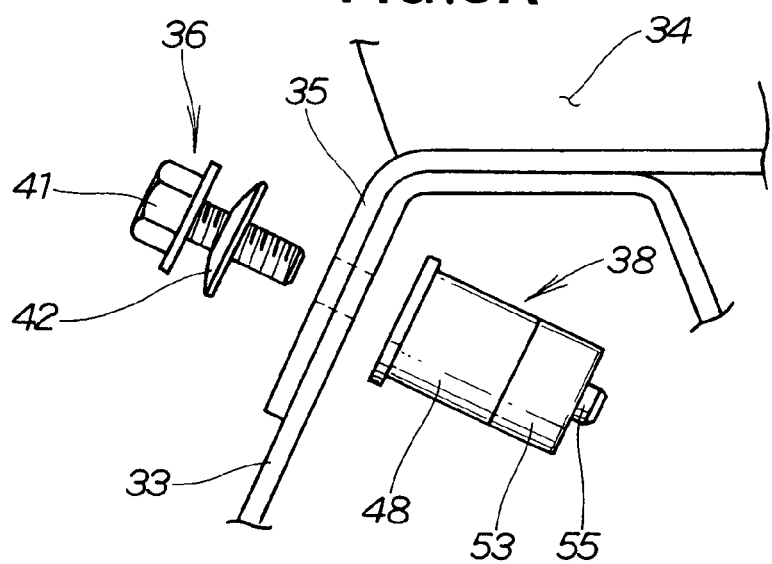
FIGS. 8A and 8B are diagrams describing the operation of the fastened members, the joined parts, and the fastening release parts shown in FIG. 2.
Figure 8B:
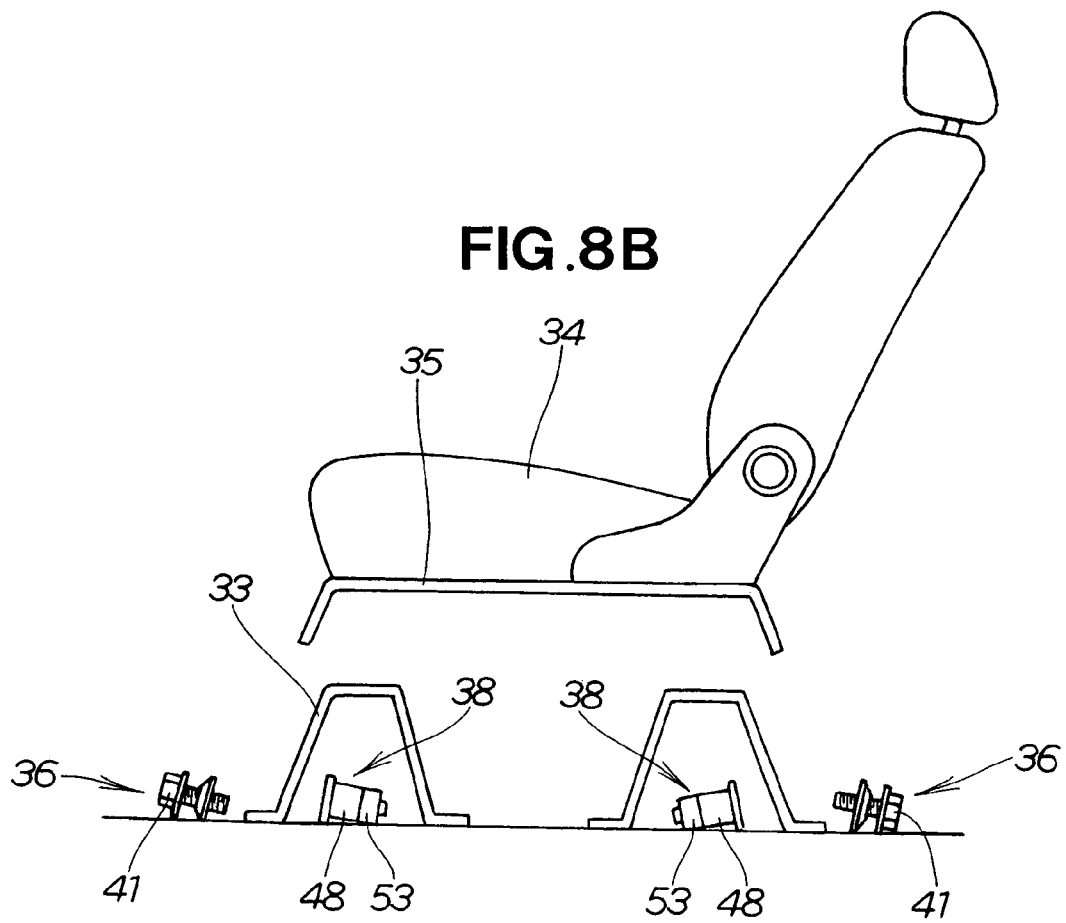

Pressing the press-button 61a turns on the press-button switch 61 and the relay 62. The power source 20 supplies electricity to the fastening release parts 38 (see FIG. 2) when the relay 62 is turned on. As a result, the fastening release parts 38 disengage the fastening parts 36, as shown in FIGS. 8A and 8B. In other words, the fastening parts 36 are separated from the vehicle body 33 and the base 35. Therefore, the seat 34 can be freely removed from the vehicle body 33.

The above description can be summarized as follows.

The member disengagement apparatus 10 comprises an operation-inhibiting unit 16 for inhibiting operation of the release operation unit 14. The operation of the release operation unit 14 during under normal circumstances can therefore be securely inhibited by the operation-inhibiting unit 16, as shown in FIG. 1. Therefore, the passenger can be securely prevented from accidentally operating the release operation unit 14 in normal situations. The fastened state can be kept sufficiently reliable because the components can be securely kept fastened by the fastening parts 36.

Then, in cases in which specific emergency signals S1, S2 have been received; i.e., in cases in which the fastening parts 36 must be disengaged, the control unit 18 controls the release operation unit 14 so as to stop inhibiting the release operation. The operation-inhibiting unit 16 then stops inhibiting the release operation. As a result, the release operation of the release operation unit 14 is enabled.

The operating of the release operation unit 14 by the passenger causes the fastening release parts 38 to disengage the fastening parts 36. The vehicle body 33 and the base 35 fastened by the fastening parts 36 can be simply and rapidly disengaged by operating the fastening release parts 38. Therefore, in an emergency in which the airbag has expanded when, for example, the automobile 11 is involved in a collision or any other accident, members that hinder the passenger from exiting the vehicle can be rapidly removed from the vehicle body by a passenger's own actions. The passenger can then rapidly exit the vehicle on their own.

Next, the specific configuration of the fastening parts 36 and the fastening release parts 38 of the first embodiment will be described.

Figure 9:
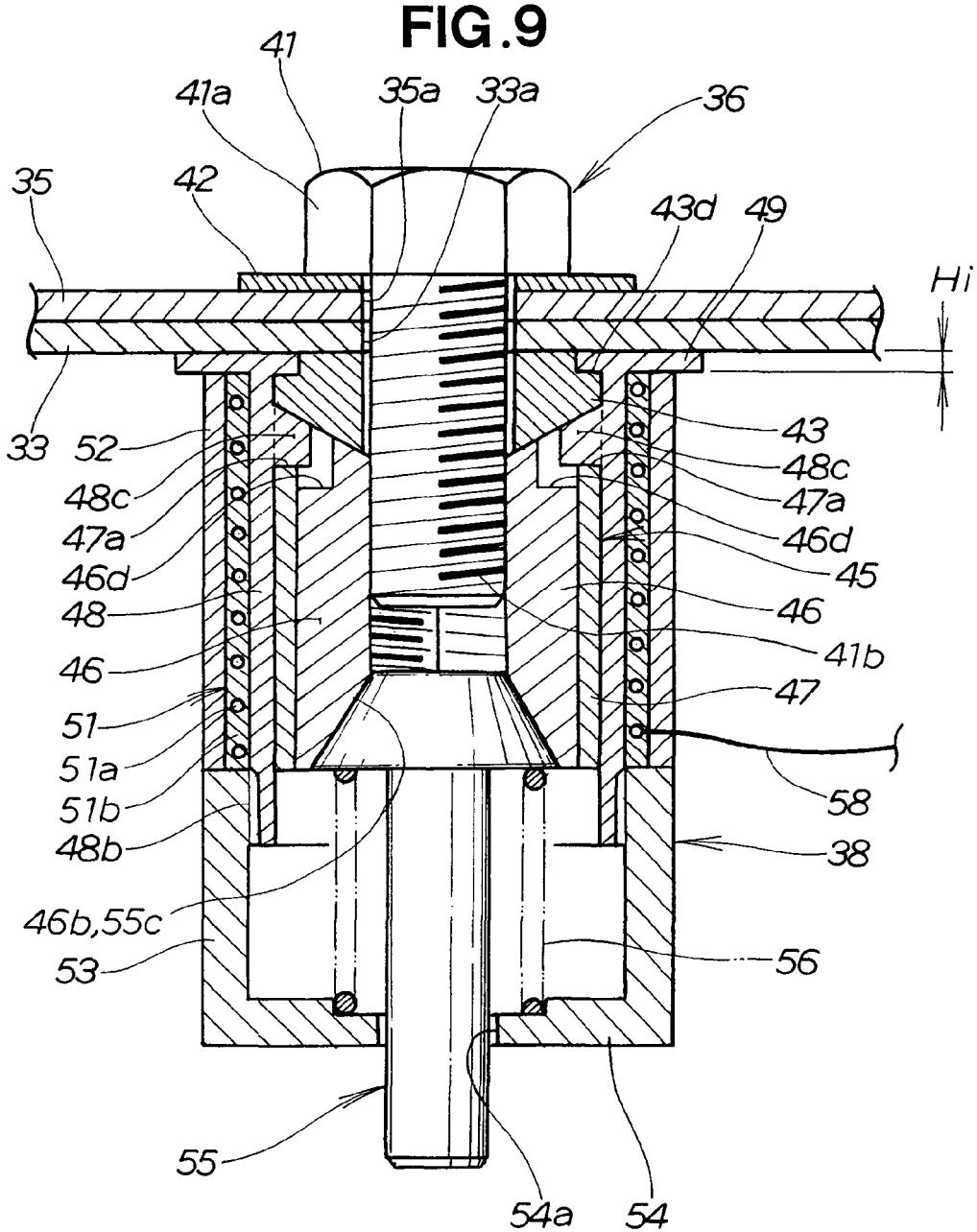
FIG. 9 is a cross-sectional view of the joined part and the fastening release part in FIG. 3.
Figure 10:
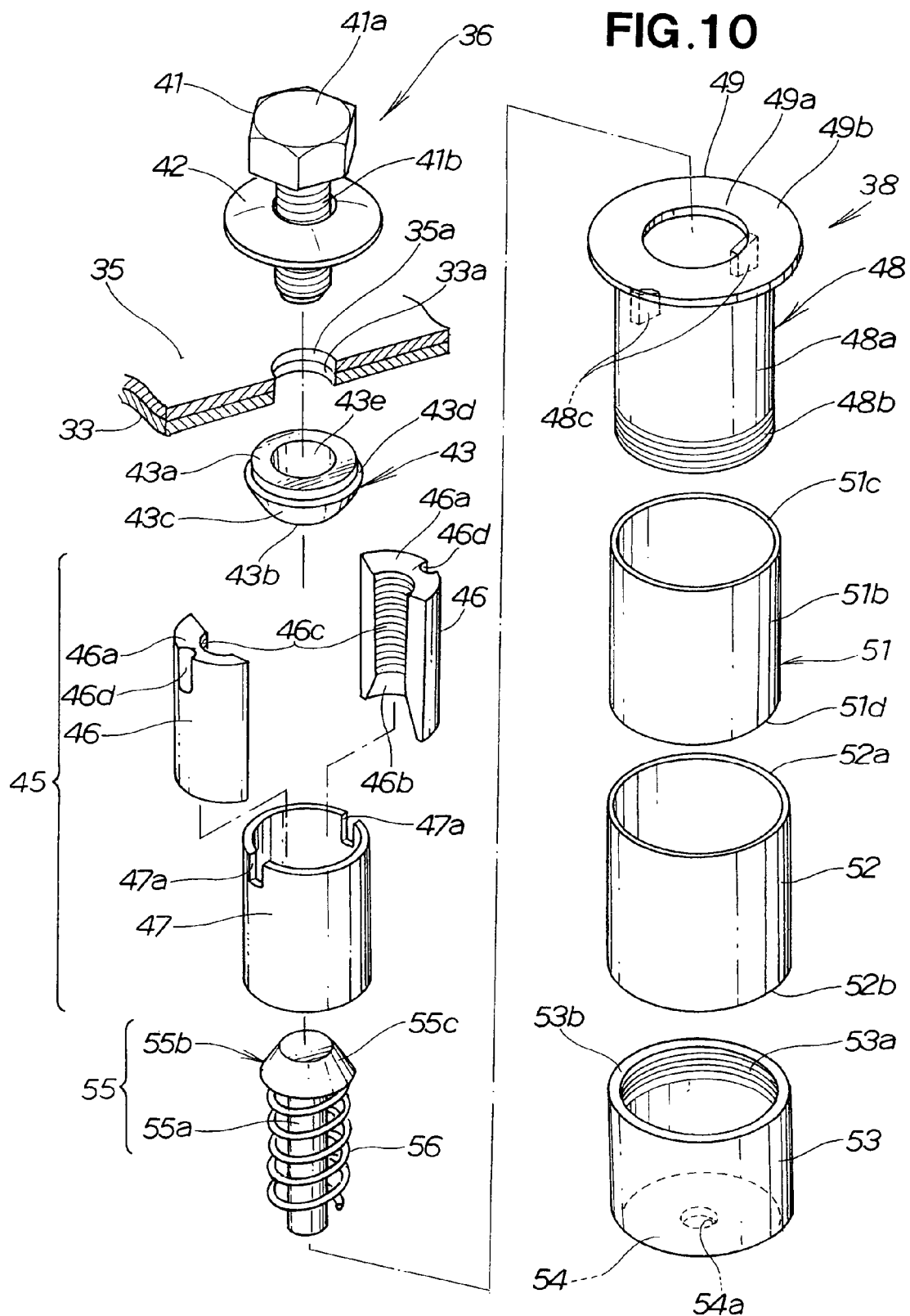
FIG. 10 is an exploded perspective view of the joined part and the fastening release part shown in FIG. 9.

The fastening parts 36 are used to fasten two superposed fastened members 33, 35 together, as shown in FIGS. 9 and 10. Each fastening part 36 is composed of a bolt 41, a disc spring washer 42, a retainer member 43, and a nut unit 45.

The bolt 41 is a headed bolt composed of a head 41a and a threaded part 41b. The threaded part 41b is inserted into through-holes 33a, 35a in the fastened members 33, 35.

The disc spring washer 42 is an urging member located between the fastened members 33, 35 and the head 41a of the bolt 41. The disc spring washer 42 urges the bolt 41 toward the head 41a in relation to the fastened members 33, 35.

In the first embodiment, an example is described in which the fastened member 35 is disposed next to the head 41a.

The retainer member 43 is a ring-shaped member disposed on the side opposite the head 41a in relation to the fastened members 33, 35. The retainer member 43 has one end surface 43a that is flat and that is in contact with the fastened member 33. The retainer member 43 also has a male tapered surface 43c (convex tapered surface 43c) that protrudes from the one end surface 43a towards the bottom end surface 43b. In other words, the male tapered surface 43c is formed into the shape of a truncated cone, so that the outside diameter of the cone gradually decreases from the one end surface 43a towards the bottom end surface 43b. Furthermore, the retainer member 43 has a stepped part 43d formed in the end surface 43a, and a through-hole 43e formed in the center.

Each nut unit 45 is composed of a pair of left and right divided nuts 46, 46 that are divided in the radial direction, and a cylindrical joining member 47 for housing the pair of divided nuts 46, 46. The pair of divided nuts 46, 46 form a cylinder when superposed together, and has a female screw 46c running through the middle. The pair of divided nuts 46, 46 are held integrally by the cylindrical joining member 47 by being fitted into the cylindrical joining member 47 while the pair of divided nuts 46, 46 are joined together. Therefore, the female screw 46c can be threaded over the threaded part 41b of the bolt 41.

When joined together, the pair of divided nuts 46, 46 has female tapered surfaces 46a, 46b at both ends, constituting a female taper (concave taper). In other words, the female tapered surfaces 46a, 46b are formed so as to sink in from the outer peripheral surfaces of the pair of divided nuts 46, 46 towards the inner peripheral surfaces. Furthermore, the pair of divided nuts 46, 46 has oblong receiving concavities 46d, 46d formed in the outer peripheral surfaces of the nuts.

The cylindrical joining member 47 has a pair of notches 47a, 47a at positions that face the receiving concavities 46d, 46d when the pair of divided nuts 46, 46 is held in an integrated manner.

The cylindrical joining member 47 is composed of a material having a low melting point (a so-called low-melting material). The cylindrical joining member 47 is subjected to a large load that accompanies the joining of the bolt 41 and the divided nuts 46, 46. Therefore, it is particularly preferable to use a low-melting metal as the low-melting material. A tin alloy, for example, is used as this low-melting metal. The cylindrical joining member 47 can be melted by heating the cylindrical joining member 47 to the melting point of the low-melting material. As a result, it is possible to separate the pair of divided nuts 46, 46 joined together by being held in the cylindrical joining member 47.

The fastened members 33, 35 can be integrally fastened together by the fastening part 36. This is achieved by fitting the retainer member 43 over the threaded part 41b of the bolt 41 that protrudes from the through-holes 33a, 35a, and then threading the nut unit 45 over the threaded part 41b protruding from the retainer member 43. In this state, the female tapered surface 46a is brought into contact with the male tapered surface 43c of the retainer member 43.

The fastening release part 38 is composed of a nut-holding part 48, a heating part 51, an insulating cover 52, a cap 53, a pusher 55, and a compressed spring 56.

The nut-holding part 48 is a member that fits together and internally houses the retainer members 43 and the nut units 45, and is also referred to as a cylindrical fitting member. The nut-holding part 48 is an integrally molded articles composed of a cylindrical body 48a, a flange 49 formed at the end of the cylindrical body 48a, a male threaded part 48b formed in the outer peripheral surface at the other end of the cylindrical body 48a, and a pair of protuberances 48c, 48c formed in the inner peripheral surface of the cylindrical body 48a.

The cylindrical body 48a fits together and internally houses the retainer member 43 and the nut unit 45.

Each flange 49 is a hollow disc whose inside diameter is less than the inside diameter of the cylindrical body 48a, and whose outside diameter is greater than the outside diameter of the cylindrical body 48a. Therefore, the inner periphery 49a of the flange 49 is expanded inward from the cylindrical body 48a. The outer periphery 49b of the flange 49 is expanded outward from the cylindrical body 48a.

The inner periphery 49a is fitted over the stepped part 43d of the retainer member 43. The height Hi (see FIG. 3) of the stepped part 43d is set to a size so that the flange 49 is sandwiched between the fastened member 33 and the stepped part 43d when the top end 43a of the retainer member 43 is brought into contact with the fastened member 33. Therefore, the nut-holding part 48 can be held on the fastened member 33 by the retainer member 43.

The pair of protuberances 48c, 48c is fitted into the pair of receiving concavities 46d, 46d and the pair of notches 47a when the nut unit 45 is housed within the cylindrical body 48a. Therefore, when the bolt 41 is threaded through the pair of divided nuts 46, 46, the nut unit 45 can be prevented from turning in relation to the nut-holding part 48 by the protuberances 48c, 48c. In other words, the protuberances 48c, 48c fulfill the role of securing the nut unit.

The heating part 51 is disposed so as to cover the periphery of the nut-holding part 48, and is composed of a heater 51a (see FIG. 9) and a heater holder 51b. The heater 51a generates heat when energized, and is made of a nichrome wire, for example. The heater 51a is preferably disposed so as to be capable of uniformly heating the entire cylindrical joining member 47, and is wound into a coil, for example. Furthermore, the heater 51a is connected to the dedicated power source 20 via the relay 62 by the wire harness 58, as shown in FIG. 1. The heater holder 51b is a cylindrical member inside of which a heater 51a is placed, and is composed of a material having good thermal conductivity. Thus, the heating part 51 is formed so as to be entirely cylindrical, and the cylindrical body 48a is fitted inside the cylinder.

The insulating cover 52 is formed into a cylindrical shape out of an insulating material, and has a heating part 51 fitted in the interior. Covering the heating part 51 with the insulating cover 52 makes it possible to prevent heat radiation from the heating part 51 out to the exterior. As a result, the heat from the heating part 51 can be efficiently transferred to the cylindrical joining member 47. The length of the insulating cover 52 is preferably equal to the length of the heating part 51.

The cap 53 is a bottomed cylindrical member for closing off the end of the nut-holding part 48 at the side facing the male threaded part 48b. The cap has a female threaded part 53a in the opening, as well as a through hole 54a in the center of the bottom 54. The cap 53 is attached to the bottom end of the nut-holding part 48 by threading the female threaded part 53a over the male threaded part 48b of the nut-holding part 48.

After the heating part 51 and the insulating cover 52 are fitted over the cylindrical body 48a of the nut-holding part 48, the heating part 51 and the insulating cover 52 can be attached to the nut-holding part 48 by attaching the cap 53 to the nut-holding part 48. In other words, the heating part 51 and the insulating cover 52 can be encased by the flange 49 and the end surface 53b on the open side of the cap 53. For example, one end 51c of the heating part 51 and one end 52a of the insulating cover 52 may be in contact with the flange 49. The other end 51d of the heating part 51 and the other end 52b of the insulating cover 52 may be in contact with the end surface 53b of the cap 53.

The pusher 55 and the compressed spring 56 are housed within the cap 53.

The pusher 55 is composed of a round rod 55a and a head 55b integrally formed at one end of the rod 55a. The rod 55a extends from the inside of the cap 53, through the through hole 54a, and out to the exterior of the cap 53. The head 55b has a male tapered surface 55c that fits into the female tapered surfaces 46a, 46b in the pair of divided nuts 46, 46. In other words, the male tapered surface 55c is a convex tapered surface that protrudes into the female tapered surfaces 46a, 46b. The taper angle of the male tapered surface 55c is equal to the taper angle of the female tapered surfaces 46a, 46b.

The compressed spring 56 is an urging member that is located in a compressed state between the bottom 54 of the cap 53 and the head 55b of the pusher 55. Therefore, the male tapered surface 55c is urged into the female tapered surfaces 46a, 46b by the compressed spring 56. The rod 55a is inserted through the compressed spring 56.

Next, the operation of the fastening part 36 and the fastening release parts 38 will be described with reference to FIGS. 11A through 11D.

Figure 11A:
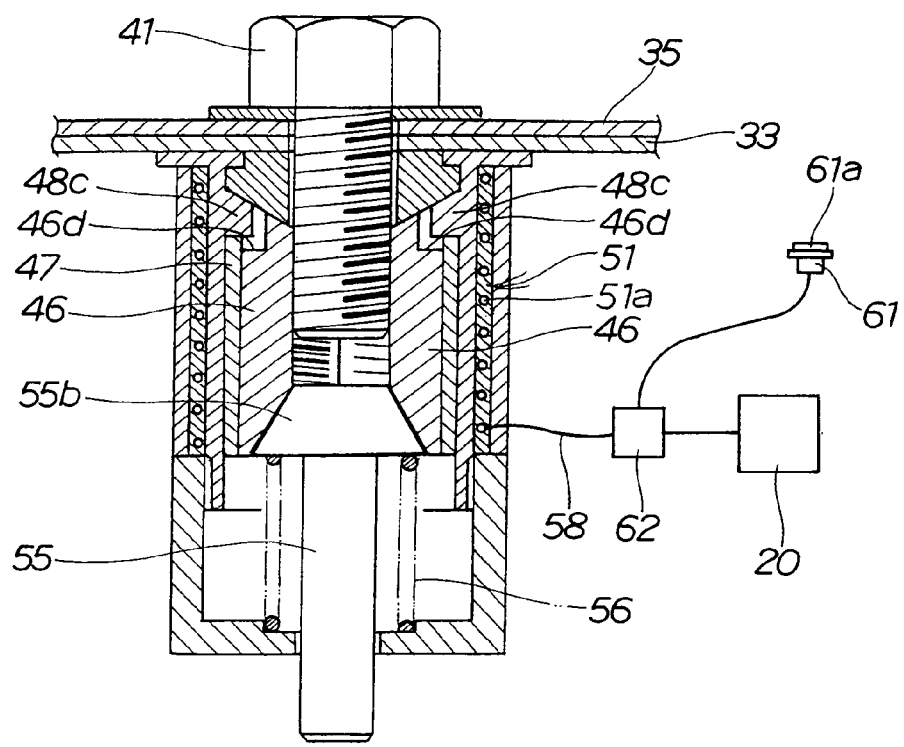
FIGS. 11A through 11D are diagrams describing the action of the joined part and the fastening release part shown in FIG. 9.

When the press-button switch 61 is turned on, the relay 62 turns on, and the dedicated power source 20 therefore supplies electricity to the heater 51a, as shown in FIG. 11A.

Figure 11B:
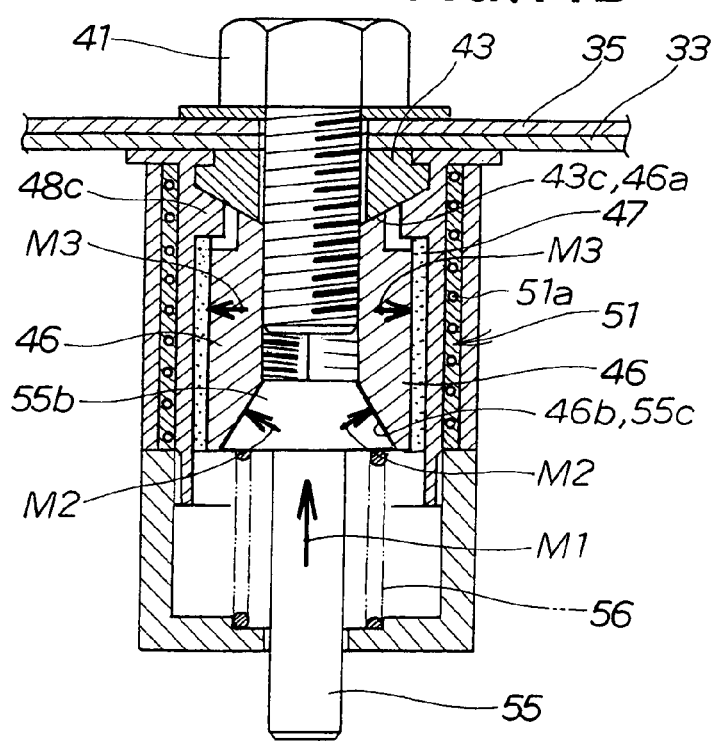

As a result, the heater 51a generates heat, and the cylindrical joining member 47 is heated to the melting point of the low-melting material of the member, as shown in FIG. 11B. The cylindrical joining member 47 is thereby melted. The compressed spring 56 pushes on the pusher 55 in the direction of the arrow M1 by means of its urging force. A pressure force as indicated by the arrow M2 acts on the female tapered surface 46b from the male tapered surface 55c. A component force acts on the female tapered surface 46b in the radial direction according to this pressure force. Moreover, since the female tapered surface 46a is in contact with the male tapered surface 43c of the retainer member 43, a component force acts on the female tapered surface 46a in the radial direction as well, according to the pressure force in the direction of the arrow M1. As a result, the pair of divided nuts 46, 46 is opened outward in the radial direction, as indicated by the arrow M3 in FIG. 11B.

Figure 11C:
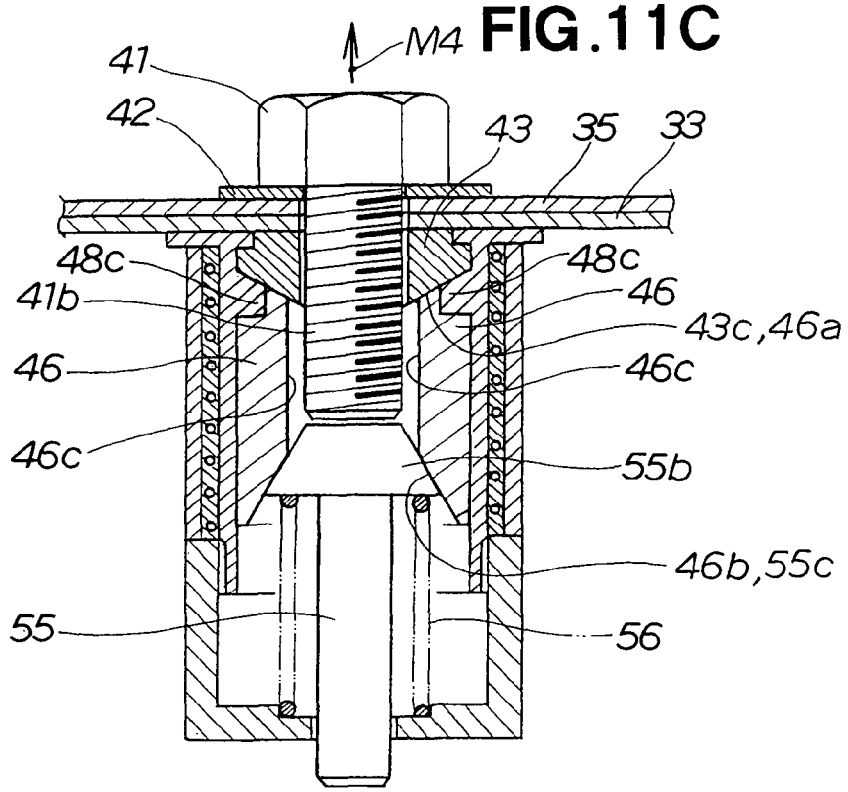

The female screws 46c, 46c in the divided nuts 46, 46 then separate from the threaded part 41b of the bolt 41, as shown in FIG. 11C. At this point, the disc spring washer 42 forces the bolt 41 up and outward by the urging force, as indicated by the arrow M4.

Figure 11D:
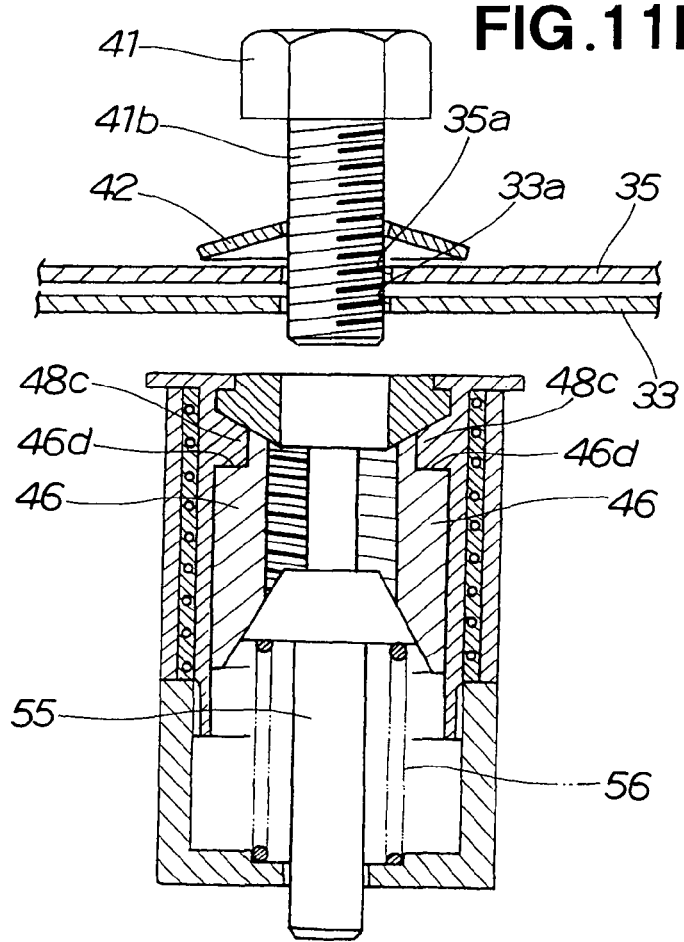

As a result, the bolt 41 exits the through-holes 33a, 35a, as shown in FIG. 11D. The fastened members 33, 35 fastened by the fastening part 36 are disengaged in this manner. Moreover, since the cylindrical joining member 47 is composed of a low-melting material, the fastening part 36 can be disengaged very rapidly with a simple configuration.

Next, the fastening part and the fastening release part of the second embodiment will be described with reference to FIGS. 12 and 13B. In the second embodiment, components similar to those of the first embodiment are denoted by the same numerical symbols, and descriptions thereof are omitted.

Figure 12:
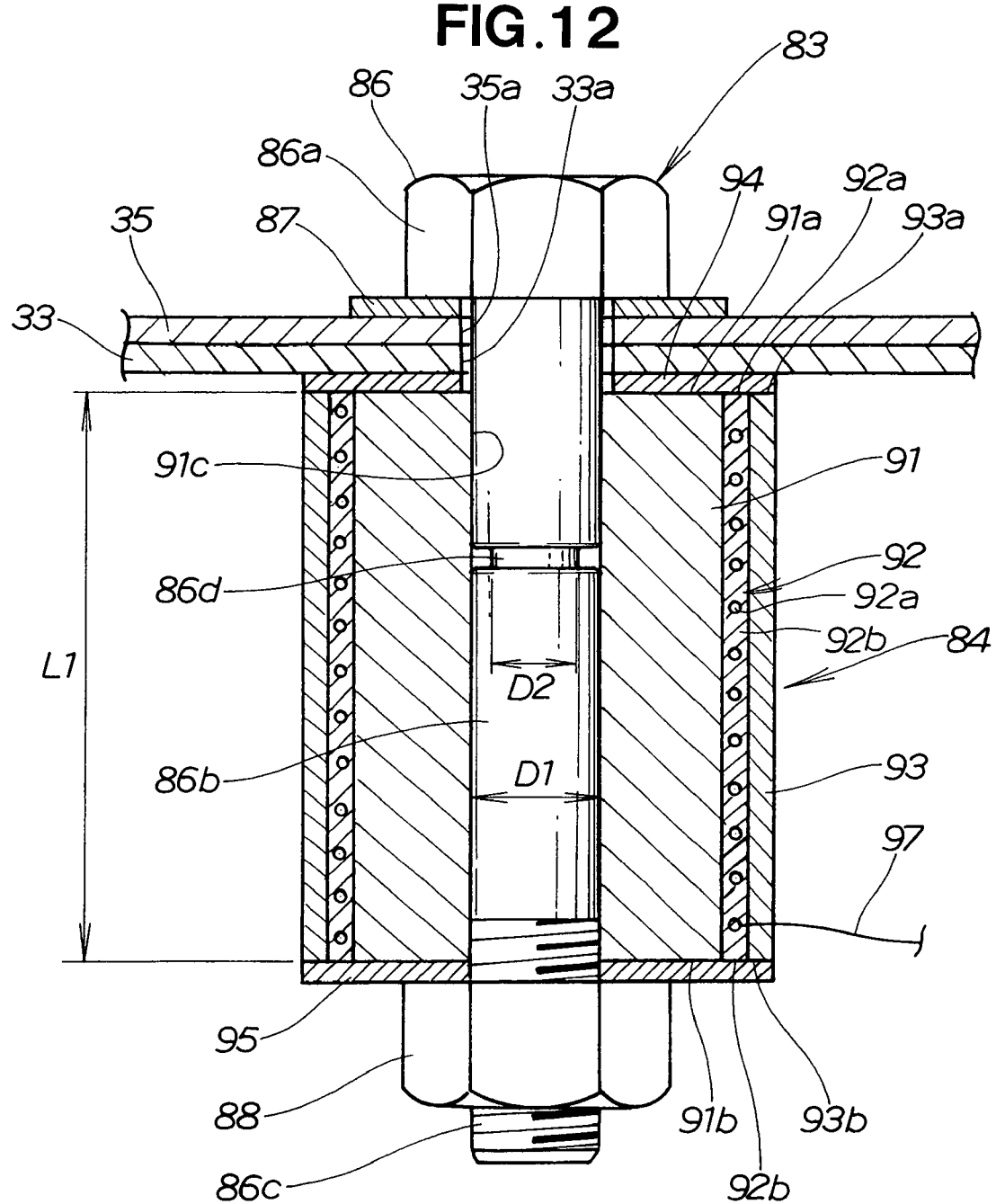
FIG. 12 is a cross-sectional view showing the relation of the fastening release part with the joined part, according to a second embodiment of the present invention.

A fastening part 83 of the second embodiment depicted in FIG. 12 has a configuration that corresponds to the fastening part 36 depicted above in FIG. 9. In other words, this fastening part 83 is used to fasten together two superposed fastened members 33, 35. Also, a fastening release part 84 of the second embodiment depicted in FIG. 12 has a configuration that corresponds to the fastening release part 38 depicted above in FIG. 9. In other words, the fastening release part 84 disengages the fastening part 83. The fastening part 83 and the fastening release part 84 of the second embodiment are described in detail hereinbelow.

The fastening part 83 is composed of a bolt 86, a flat washer 87, and a nut 88, as shown in FIG. 12.

The bolt 86 is a headed bolt composed of a head 86a, and a shank 86b that passes via through-holes 33a, 35a in the fastened members 33, 35. The shank 86b has a threaded part 86c formed at the distal end, and a brittle part 86d formed substantially in the middle of the longitudinal direction. The brittle part 86d is a constricted portion that has a smaller diameter and is formed in the shank 86b. The diameter D2 of the brittle part 86d is set to be less than the diameter D1 of the shank 86b (D1 >D2). In the second embodiment, an example is described in which the fastened member 35 is disposed on the side of the head 86a.

The flat washer 87 is located between the fastened members 33, 35 and the head 86a of the bolt 86. The nut 88 is threaded over the threaded part 86c.

The fastening release part 84 is fitted over the shank 86b, and is held between the fastened member 33 and the nut 88. To give a detailed description, the fastening release part 84 is composed of a cylindrical actuator 91, a heating part 92, an insulating cover 93, and two flat washers 94, 95.

The cylindrical actuator 91 is a cylindrical body having a hollow part 91c in the center, and is made of a shape-memory material. This shape-memory material extends to full length L1 when heated to a specific temperature, and then returns to the original length. A titanium-nickel alloy (Ti—Ni alloy), for example, is used as the shape-memory material. The cylindrical actuator 91 is designed to be at full length L1 at room temperature.

The heating part 92 has the same configuration as the heating part 51 depicted above in FIG. 9, and is composed of a heater 92a and a heater holder 92b. The heater 92a is connected by a wire harness 97 to a dedicated power source 20 via a relay 62 shown in FIG. 1.

The insulating cover 93 has the same configuration as the insulating cover 52 depicted above in FIG. 9.

The full length of the heating part 92 and the full length of the insulating cover 93 are designed to be equal to the full length L1 of the cylindrical actuator 91 at room temperature. The flat washers 94, 95 are superposed over the two end surfaces of the cylindrical actuator 91, the heating part 92, and the insulating cover 93. The outside diameters of the flat washers 94, 95 are designed to be either equal to or greater than the outside diameter of the insulating cover 93.

Next, the procedure of assembling the fastening part 83 and the fastening release part 84 will be described.

First, the two fastened members 33, 35 are superposed on each other. Next, the shank 86b of the bolt 86 is inserted through the flat washer 87, and the shank 86b is then inserted via the through-holes 33a, 35a while the flat washer 87 is interposed between the fastened member 35 and the head 86a.

Next, the cylindrical actuator 91, the heating part 92, and the insulating cover 93 are all fitted together.

Next, the flat washer 94, the hollow part 91c of the cylindrical actuator 91, and the flat washer 95 are fitted in this order over the shank 86b protruding from the through-hole 33a.

Next, the nut 88 is threaded over the threaded part 86c protruding from the cylindrical actuator 91, and the assembly operation is complete.

The two fastened members 33, 35 can thus be fastened together by means of the urging force of the bolt 86 and the nut 88. At the same time, the fastening release part 84 can be incorporated into the fastening part 83.

In this state, the top end 91a of the cylindrical actuator 91, the top end 92a of the heating part 92, and the top end 93a of the insulating cover 93 are all in contact with the flat washer 94. Also, the bottom end 91b of the cylindrical actuator 91, the bottom end 92b of the heating part 92, and the bottom end 93b of the insulating cover 93 are all in contact with the flat washer 95.

Next, the operation of the fastening part 83 and the fastening release part 84 will be described with reference to FIGS. 13A and 13B.

When the press-button switch 61 is turned on, the relay 62 turns on, and the dedicated power source 20 therefore supplies electricity to the heater 92a, as shown in FIG. 13A. The heater 92a generates heat and the cylindrical actuator 91 is heated. The cylindrical actuator 91 returns to the original shape when heated to a specific temperature, and extends to a length L2 (L1 <L2), as shown in FIG. 13B. The cylindrical actuator 91 produces a restoring force in the direction of the arrow N1 shown in FIG. 13A (the longitudinal direction of the cylindrical actuator 91) when extended to the original length L2. This restoring force acts as axial force on the shank 86b of the bolt 86 through the flat washers 94, 95. Tensile force indicated by the arrow N2 acts on the brittle part 86d of the shank 86b as well. As a result, tensile stress is concentrated in the brittle part 86d. The brittle part 86d then breaks as shown in FIG. 13B.

The fastened members 33, 35 fastened by the fastening part 83 are disengaged in this manner.

As described above, the second embodiment results in the same effects as the first embodiment. Moreover, since the cylindrical actuator 91 is configured from a shape-memory material, the fastening parts 36 can be disengaged very rapidly with a simple configuration.

Next, the applications of the member disengagement apparatus 10 and of the fastening parts 36, 83 will be described. The following applications (1) through (4) are possible, for example. These cases have the same effects as cases in which a seat 34 is attached to a vehicle body 33 as described above.

(1) The above-described components may be used in locations where a seat back is attached to a seat cushion in an automobile 11. (2) The components may be used in the doors of the automobile 11. For example, the components are used in the locations where door hinges, door strikers, and door stops are attached to the vehicle body. (3) The components may be used in the seat belts of the automobile 11. For example, the components may be used in the locations where the seat belt anchors (attachment parts) are attached to the vehicle body. (4) The components may be used in the steering wheel of the automobile 11. For example, the components may be used in the locations where the steering wheel handle is attached to the steering wheel shaft.

In the present invention, the release operation unit 14 is not limited to a structure in which the release operation switch 61 and the relay 62 are combined, but may also be configured to have only the release operation switch 61 and no relay 62. In this case, electricity is supplied from the dedicated power source 20 to the fastening release parts 38 via the release operation switch 61.

Also, the release operation switch 61 is not limited to a press-button switch, and can be any switch that a person can arbitrarily operate. For example, any switch that can be turned on and off can be used, whether the switch be pulled, touched, swung, or rotated.

Also, the operation-inhibiting unit 16 is not limited to a configuration having a combination of a lid 64, a supporting pin 67, a torsion coil spring 68, and a lid opening part 31. For example, the lid opening part 31 is not limited to a solenoid, and may be a latching mechanism or a clamping mechanism. The member that covers the release operation unit 14 is not limited to the lid 64, and a shutter or a cover may be used, for example. In cases in which a detachable cover is used, the cover can be configured so as to be removed by the pressure force from the lid opening part 31.

In the fastening release parts 38 in the first embodiment, the member for urging the pusher 55 into the divided nuts 46, 46 is not limited to the compressed spring 56, and another possibility is to use disc springs and washers combined together, for example.

Also, the divided nuts 46, 46 in the first embodiment need only be divided into multiple parts in the radial direction, and may include three or four divisions, for example.

The member disengagement apparatus 10 of the present invention is used to disengage fastened members 33, 35 fastened by fastening parts 36, 83, and is particularly suitable for use in an automobile or another vehicle 11.

Obviously, various minor changes and modifications of the present invention are possible in light of the above teaching. It is therefore to be understood that within the scope of the appended claims the invention may be practiced otherwise than as specifically described.

What is claimed is:

1. A member disengagement apparatus for disengaging a plurality of fastened members fastened by fastening parts, the apparatus comprising:
   fastening release parts for disengaging the fastened members, wherein each of the fastening release parts comprises:
      a heating part for generating heat according to a release operation of the release operation unit; and
      a joining member composed of a low-melting material that melts when heated by the heating part; wherein the fastening parts are disengaged by melting of the joining member;
   a release operation unit for releasing the fastening release parts;
   an operation-inhibiting unit for inhibiting a release operation of the release operation unit; and
   a control unit for controlling the operation-inhibiting unit such that the release operation is no longer inhibited when specific emergency signals are received.

2. The member disengagement apparatus of claim 1, wherein the emergency signals include a signal that causes a vehicle airbag to expand and deploy; and the fastened members are members of a vehicle that are disengaged during specific emergencies.

3. The member disengagement apparatus of claim 2, wherein the release operation unit and the operation-inhibiting unit are disposed in a widthwise middle of an instrument panel of the vehicle.

4. The member disengagement apparatus of claim 3, wherein the operation-inhibiting unit comprises:
   a holding concavity that holds the release operation unit and that is formed in the instrument panel;
   a lid for opening and closing the holding concavity;
   a supporting pin for openably and closeably supporting one end of the lid;
   an urging member for urging the lid in an opening direction; and
   a lid opening part for opening the lid according to a determent release signal from the control unit.

5. The member disengagement apparatus of claim 1; wherein the release operation unit comprises a press-button switch for activating the release operation.

6. A member disengagement apparatus for disengaging a plurality of fastened members fastened by fastening parts, the apparatus comprising:
   fastening release parts for disengaging the fastened members,
   a release operation unit for releasing the fastening release parts,
   wherein each of the fastening release parts comprises:
   a heating part for generating heat according to a release operation of the release operation unit; and
   a joining member composed of a low-melting material that melts when heated by the heating part; wherein the fastening parts are disengaged by melting of the joining member;
   an operation-inhibiting unit for inhibiting a release operation of the release operation unit;
   a control unit for controlling the operation-inhibiting unit such that the release operation is no longer inhibited when specific emergency signals are received; and
   a dedicated power source for supplying electricity to the control unit and for disengaging the plurality of fastened members when the release operation unit is activated, wherein the dedicated power source and the control unit are configured as one unit.

* * * * *